INVENTOR.
GEORGE R. HAMILTON JR.
By Donald G. Dalton
Attorney

United States Patent Office 3,211,372
Patented Oct. 12, 1965

3,211,372
COMBUSTION-CONTROL SYSTEM
George R. Hamilton, Jr., Crown Point, Ind., assignor to United States Steel Corporation, a corporation of New Jersey
Filed May 10, 1963, Ser. No. 279,439
3 Claims. (Cl. 236—15)

This invention relates to improved methods and apparatus for controlling the input of air and fuel to gas-fired furnaces.

Furnaces used for many purposes must operate under carefully controlled conditions. For example, it may be necessary to operate a metallurgical furnace at a predetermined temperature and/or to maintain an atmosphere of particular characteristics therein. Another example is a furnace used to heat a boiler which may be required to produce steam at a controlled pressure. Conventionally such furnaces are equipped with automatic means for maintaining a predetermined ratio of air to fuel. The flow rates of both air and fuel gas are measured and compared by a ratio-controlling device, which also adjusts the flow of one to maintain it in a predetermined relation to the other. In many installations the composition of the fuel gas may vary from time to time. Both the calorific value and specific gravity may change with changes in composition. The proportion of air required for combustion of a fuel gas bears a relation to its calorific value, that is, the higher the calorific value, the more air required. Flow meters of the differential pressure type are designed according to formulae in which the square root of the specific gravity of the gas is a factor in the denominator, whereby changes in specific gravity introduce error in measuring the flow rate. To maintain a desired combustion condition, it is necessary to adjust the proportion of air for changes in calorific value of the fuel gas and also to compensate for measuring errors caused by changes in its specific gravity.

The "Wobbe index" of a fuel gas is a convenient measurement for taking into account both its calorific value and its specific gravity. By definition, the Wobbe index is the calorific value of a gas divided by the square root of its specific gravity. As a means for compensating for variations in fuels to maintain desired conditions in a furnace, it is known to introduce a diluting gas (commonly air) to the fuel gas in quantities which maintain the diluted fuel gas at a constant Wobbe index. The ratio of combustion air to diluted fuel gas then can remain constant for any given combustion condition. For showings of several automatic arrangements for effecting such control, reference can be made to a paper by K. A. Steele entitled "Control of Flame Characteristics by Wobbe-Index Value" published in "Instrument Engineer" Volume 2, Number 7, April 1959, pages 125–131. I have observed that arrangements used previously for this purpose have disadvantages for certain applications. They require elaborate equipment, and hence can be used economically only for controlling a large system at its source, rather than only part of a system at the point of use. Some fuel gases, notably coke oven gas, form explosive mixtures when mixed with air over broad composition ranges. Hence diluting fuel gas with air may be hazardous, especally when a large system is involved.

An object of the present invention is to provide improved methods and apparatus for compensating for variations in fuel gas composition in which the equipment is simplified and is applied at the point of use, where it operates in conjunction with the usual control equipment.

A further object is to provide improved methods and apparatus for effecting this form of control in which I avoid diluting fuel gas with air, thereby overcoming a possible hazard.

A more specific object is to provide improved control methods and apparatus which measure the Wobbe index of a fuel gas and automatically adjust the proportion of combustion air in accordance with variations in this index without tampering with the fuel gas composition.

Figure 1:
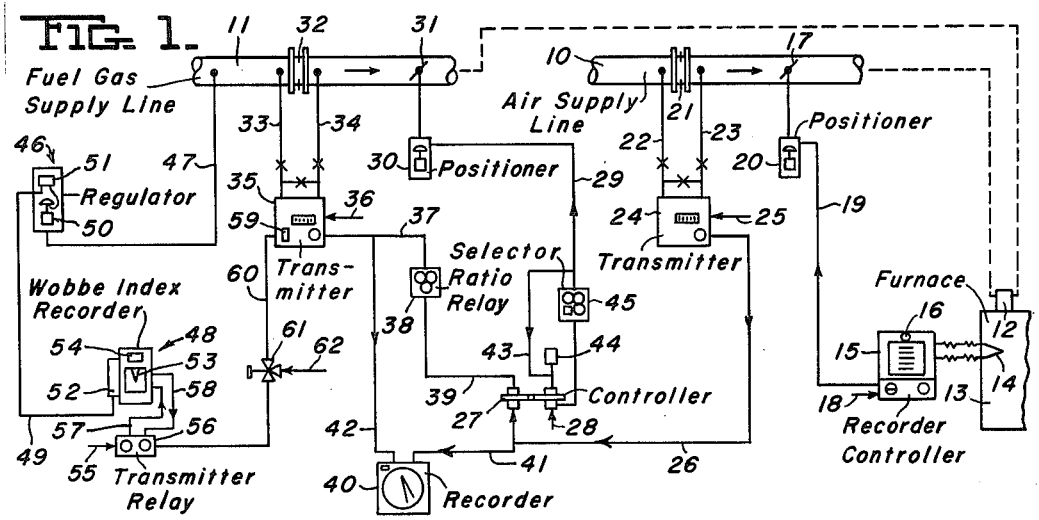
FIGURE 1 is a schematic diagram of a control apparatus arranged in accordance with my invention.

FIGURE 1 shows lines 10 and 11 for supplying combustion air and fuel gas respectively in a controlled ratio to a burner 12 of a furnace 13. In this example the furnace temperature is the characteristic which is controlled, and the furnace contains a temperature-sensing element 14 connected to a conventional recorder-controller 15 equipped with a set-point adjuster 16. A suitable recorder is available commercially from Leeds and Northrup Co., Philadelphia, Pa. as "Speedomax G," Model S, and is described in a printed publication by the supplier, Data Sheet ND46(11). FIGURE 1 shows an "air-primary" system, in which the output signal from the recorder-controller 15 adjusts the setting of a valve 17 in the air supply line 10. A line 18 is connected to the recorder-controller to furnish compressed air at 17 p.s.i. A line 19 carries pneumatic pressure signals in the range of 3 to 15 p.s.i. from the recorder-controller to a positioner 20, which automatically adjusts the valve setting to increase or decrease the flow of combustion air when the furnace temperature drops or rises from a value set on the adjuster 16. A suitable positioner is available commercially from Hagan Chemicals and Controls, Inc. Pittsburgh, Pa. as the "Hagan 5" x 10" Pneumatic Power positioner" and is described in a printed publication by the supplier, Specification Sheet TP–1510A.

The air supply line 10 also contains a metering orifice plate 21. Pressure impulse lines 22 and 23 are connected to line 10 on opposite sides of the orifice plate and lead to a conventional air-flow transmitter 24. A suitable transmitter is available commercially from Hagan Chemicals and Controls, Inc. as the "Hagan Ring Balance Meter," and is described in a printed publication by the supplier, Specification Sheet PM–10002A, copyright 1957. A line 25 is connected to transmitter 24 to furnish compressed air at 30 p.s.i. A line 26 carries pneumatic pressure signals in the range of 0 to 30 p.s.i. from transmitter 24 to a conventional gas-flow controller 27. A suitable controller is available commercially from Hagan Chemicals and Controls, Inc. as the "Hagan Ratio Totalizer" and is described in a printed publication by the supplier, Bulletin MSP–120, copyright 1957, and also in Markson Patent No. 2,631,599. A line 28 is connected to controller 27 to furnish compressed air at 30 p.s.i. A line 29 carries pneumatic pressure signals in the range of 0 to 30 p.s.i. from controller 27 to a valve positioner 30 (similar to 20) which adjusts a valve 31 in the fuel supply line 11. Line 11 also contains a metering orifice plate 32. Pressure impulse lines 33 and 34 are connected to line 11 on opposite sides of the orifice plate and lead to a transmitter 35 (similar to 24 but modified as hereinafter explained). A line 36 is connected to transmitter 35 to furnish compressed air at 30 p.s.i. A line 37 carries pneumatic pressure signals in the range of 0 to 30 p.s.i. from transmitter 35 to a conventional ratio relay 38. A suitable relay is available commercially from Hagan Chemicals and Controls, Inc. as the "Hagan Model 'LO' Ratio Relay" and is described in a printed publication by the supplier, Specification Sheet SP–5030A, copyright 1956, and also in Donaldson Patent No. 2,304,783. A line 39 carries pneumatic pressure signals in the range of 0 to 30 p.s.i. from the ratio relay to the gas-flow controller 27.

As air flows through the orifice in plate 21 in the air supply line 10, there is a pressure drop which varies in magnitude with the flow rate. Whenever an adjustment in the setting of valve 17 changes the air-flow rate, the pressure drop across the orifice and the magnitude of the pressure signal from transmitter 24 change proportionately. The two pressure signals reaching the gas-flow controller 27 from lines 26 and 39 normally are in balance, whereby the controller transmits a steady signal via line 29 to the positioner 30. Any change in the signal from transmitter 24 creates an unbalance, which alters the signal to the valve positioner 30, whereupon valve 31 in the fuel supply line 11 is adjusted in the same direction as valve 17. The flow rate through line 11, the pressure drop across the orifice in plate 32, and the magnitude of the pressure signals from transmitter 35 and ratio relay 38 change accordingly. When the flow of fuel reaches the proper ratio to the flow of air, the signals reaching the gas flow controller 27 come back into balance and there is no further adjustment until a new unbalance occurs. The purpose of the ratio relay 38 is to enable manual adjustments to be made in the ratio which is maintained. Preferably a conventional fuel-air flow recorder 40 is connected to lines 26 and 37 via lines 41 and 42 to maintain a record of the flow rates. A suitable recorder is available commercially from Hagan Chemicals and Controls, Inc. as the "Model 6000 Receiver" and is described in a printed publication by the supplier, Bulletin MYP–647A. When the gas flow controller 27 is the particular instrument referred to, a feedback line 43 extends from line 29 to a fourth connection on the controller, and a volume chamber 44 is connected to the feedback line. Line 29 preferably contains a manual-automatic selector 45 to enable the control to be operated manually, if desired.

The arrangement thus far described, as well as the individual instruments, is conventional; hence I have not described it in greater detail. It is of course understood that the instruments listed are only by way of example, and equivalent instruments of other suppliers could be substituted. Likewise the pressures stated are only exemplary and could vary widely.

In accordance with my invention, I connect a flow and pressure regulator 46 to the fuel supply line 11 via a sampling line 47. I connect a Wobbe index recorder 48 to regulator 46 via a line 49. Both regulator 46 and recorder 48 per se are conventional instruments. They are described in detail in the aforementioned Steele paper, and are available commercially from George Kent Limited, Luton, Bedfordshire, England. To summarize their operation briefly, a continuously flowing sample of the fuel gas passes from line 11 via line 47 to a governor 50 in the regulator 46. The governor accepts the gas at initial pressure of 2 to 36 inches water gauge and first reduces the pressure to about 1 inch water gauge. An oil-sealed bell-type governor 51 in the regulator reduces the pressure to a constant value, which is held without deviation. Next the sample passes through an orifice (not shown). Since the pressure is fixed, the flow is inversely proportional to the square root of the specific gravity of the gas. Reference can be made also to British Patent No. 430,157 for a showing of a suitable bell-type governor and orifice arrangement. Line 49 next carries the gas to a burner 52 within the Wobbe-index recorder 48. The burner is surrounded by two concentric tubes connected at their lower ends. The products of combustion pass through the inner tube and the heat released causes differential expansion of the two tubes. This expansion is amplified by a magnifying mechanism and the resulting movement used to actuate a pen arm 53. Reference can be made also to British Patent No. 161,395 for a showing of a suitable arrangement of tubes and magnifying mechanisms. A linkage (not shown) connects the magnifying mechanism also to a conventional transmitter 54 housed within the same cabinet as recorder 48. A suitable transmitter is available commercially from George Kent Limited as the "Mark 24 Pneumatic Transmitting Unit" and is described in a printed publication by the supplier, Publication 256. Compressed air is supplied to transmitter 54 from a line 55 through a conventional transmitter relay 56 and a line 57. The transmitter relay serves to adjust the pressure to 17 p.s.i. A line 58 carries pneumatic pressure signals in the range of 3 to 15 p.s.i. proportional to the Wobbe index value from transmitter 54 back to the transmitter relay 56. A suitable transmitter relay is available commercially from George Kent Limited as the "Mark 24 Transmitter Relay."

Transmitter 35 is modified by the addition of a compensating device 59. Transmitters thus equipped are available commercially. As hereinbefore stated, the Hagan Ring Balance Meter is one example of a suitable transmitter, and it can be purchased with a compensating device. Reference can be made to a printed publication by the supplier, Bulletin MSP–147 for an explanation. The publication mentions correcting for temperature, pressure and gravity, but correction for Wobbe index is accomplished in the identical manner to the others. A line 60 transmits pneumatic pressure signals from the transmitter relay 56 to the compensating device 59. Preferably line 60 contains a manual-automatic selector switch 61 for Wobbe index compensation. A line 62 is connected to switch 61 to furnish compressed air at a pressure representative of average conditions, for example 4 p.s.i. If the Wobbe index mechanism is not working properly, switch 61 can be set to apply pressure from line 62 to line 60, and the remaining parts can operate in the conventional manner.

If a change takes place in the Wobbe index of the fuel gas in line 11, the Wobbe index recorder 48 actuates the transmitter 54 and transmitter relay 56 to change the magnitude of the pressure signal in line 60. The change in this signal actuates the compensating device 59 in transmitter 35. For any given flow of fuel in line 11, the magnitude of pressure signal in lines 37 and 39 becomes different. Thus the change in Wobbe index causes an unbalance in the pressure signals applied from lines 26 and 39 to controller 27. There is a change in the magnitude of the pressure signal transmitted from the controller via line 29 to the positioner 30. Valve 31 is adjusted accordingly to change the rate of gas flow through line 11 restore the balance. This change of course corrects the ratio of air to fuel, since no corresponding adjustment is made in the air flow. The correction is made without introducing air or other diluting gas to the fuel line 11. The equipment required is relatively simple, and one regulator 46 and one recorder 48 can actuate a number of compensating devices 59 in different furnaces connected to the same fuel supply.

Figure 2:
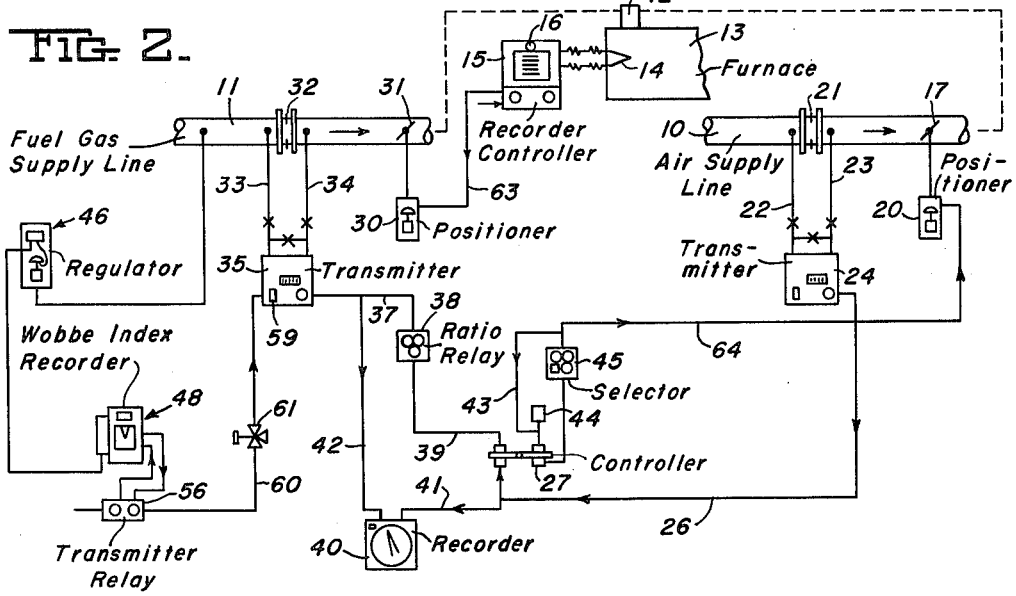
FIGURE 2 is a schematic diagram similar to FIGURE 1, but showing a modification.

FIGURE 2 shows a modification in which my invention is applied to a "fuel-primary" system. The system includes components similar to those already described, but some of the connections are rearranged. A line 63 carries pneumatic pressure signals from the recorder-controller 15 to the positioner 30 which regulates valve 31 in the fuel gas line 11. A line 64 carries pneumatic signals from the gas-flow controller 27 to the positioner 20 which regulates valve 17 in the air flow line 10. When the furnace temperature drops or rises from a set value, positioner 30 adjusts the setting of valve 31 to increase or decrease the flow of fuel to the furnace. The transmitters 35 and 24 and gas-flow controller 27 then operate to change the signal to positioner 20. The latter positioner adjusts the setting of valve 17 to change the air flow as required to maintain the proper ratio of air to fuel gas. The flow and pressure regulator 46, Wobbe index recorder 48, transmitter relay 56, and compensating device 59 are connected the same as described for FIGURE 1 and operate in the same manner, but when the Wobbe index changes, the ratio is corrected by changing the air flow rate.

Figure 3:
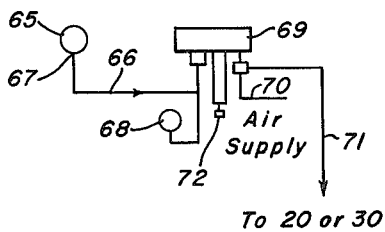
FIGURE 3 is a fragmentary diagram showing a further modification.

FIGURE 3 shows a further modification which is applicable to either FIGURE 1 or 2. In FIGURE 3 the characteristic which is measured is the pressure in a header 65 of steam produced in a gas-fired boiler. The steam pressure is maintained by evaporation of more water or less water in the boiler as required, thus requiring corresponding changes in the firing rate. A line 66 carries signals from a pressure tap 67 in the header to a pressure gage 68 and sender 69. A suitable sender is available commercially from Hagan Chemicals and Controls, Inc. as the "Type 'F' Master Sender" and is described in a printed publication by the supplier, Bulletin MSP101. A line 70 furnishes compressed air to the sender, and a line 71 carries pneumatic pressure signals from the sender to either positioner 20 (FIGURE 1) or 30 (FIGURE 2). The sender is equipped with a set-point adjuster 72 for regulating the pressure to be maintained in the header. When the pressure in the header 65 drops or rises from the value set on the adjuster 72, the sender 69 transmits a signal which changes the flow rate of air or fuel in the same manner as the embodiments already described control the temperature.

From the foregoing description it is seen that my invention affords a simple arrangement of instruments for correcting the ratio of air to fuel gas to maintain predetermined combustion conditions at a point of use, such as a furnace. The invention utilizes only standard instruments which are available commercially and it can be installed in existing systems making use of the control instruments already present.

While I have shown certain preferred embodiments of my invention, it is apparent that other modifications may arise. Therefore, I do not wish to be limited to the disclosure set forth but only by the scope of the appended claims.

I claim:

1. In a combustion system which includes a furnace, separate lines connected to said furnace for supplying streams of air and gaseous fuel respectively thereto, respective valves and orifice plates in each of said lines, respective positioners operatively connected with said valves, a temperature-sensing element in said furnace, a recorder-controller operatively connected with said element and with one of said positioners to adjust the flow rate through one of said lines to maintain a desired furnace temperature, a first transmitter operatively connected with the air supply line on opposite sides of the orifice plate to transmit signals representative of the rate of air flow, a second transmitter operatively connected with the fuel supply line on opposite sides of the orifice plate to transmit signals reprsentative of the rate of fuel flow, and a gas flow controller operatively connected with said transmitters and with the other positioner to adjust the flow rate through the other line in response to signals from the transmitters to maintain a predetermined air-fuel ratio in the furnace, the combination therewith of apparatus for compensating for variations in the composition of the fuel comprising means connected with the fuel supply line for continuously sampling the fuel, a flow and pressure regulator connected to said sampling means for bringing samples to a uniform pressure, a Wobbe index recorder connected with said regulator for burning the samples and thereby determining the Wobbe index, a third transmitter operatively connected with said Wobbe index recorder, and a compensating device embodied in said second transmitter and operatively connected with said third transmitter for adjusting the signal transmitted from said second transmitter to said controller to change the rate of fuel flow with each change in the Wobbe index and thus provide a corrected ratio which continues to maintain the desired temperature.

2. A combination as defined in claim 1 in which the valve adjusted to produce a desired furnace temperature is the valve in the line supplying air.

3. A combination as defined in claim 1 in which the valve adjusted to produce a desired furnace temperature is the valve in the line supplying fuel gas.

References Cited by the Examiner

UNITED STATES PATENTS 2,412,739   12/46   McCracken _____ 236—14
2,866,602   12/58   Daily et al. _____ 236—15

FOREIGN PATENTS 770,910   3/57   Great Britain.

OTHER REFERENCES

Lancaster, A. L.: A Modern Fuel Shut-Off System for Soaking Pits, in Iron and Steel Engineer 30 (12), pages 69–76, Dec. 1953.

EDWARD J. MICHAEL, *Primary Examiner.*

ALDEN D. STEWART, *Examiner.*